United States Patent [19]

Kageyama

[11] Patent Number: 4,829,182
[45] Date of Patent: May 9, 1989

[54] X-RAY IMAGE-PROCESSING APPARATUS

[75] Inventor: Hiroshi Kageyama, Utsunomiya, Japan

[73] Assignee: Kabushiki Kaisha Toshiba, Kawasaki, Japan

[21] Appl. No.: 911,330

[22] Filed: Sep. 25, 1986

[30] Foreign Application Priority Data

Sep. 27, 1985 [JP] Japan ................. 60-212557

[51] Int. Cl.$^4$ ............................................. H04N 5/32
[52] U.S. Cl. .................. 250/327.2; 378/175
[58] Field of Search .................... 250/327.2, 484.1; 378/175, 162

[56] References Cited

U.S. PATENT DOCUMENTS

| 3,381,128 | 4/1968 | Jimenez | 378/175 |
| 3,859,527 | 1/1975 | Luckey | 250/327.2 |
| 4,485,304 | 11/1984 | Teraoka et al. | 250/327.2 |
| 4,564,861 | 1/1986 | Hishinuma et al. | 378/162 |
| 4,590,517 | 5/1986 | Kato et al. | 250/327.2 |
| 4,683,377 | 7/1984 | Hishinuma et al. | 250/372.2 |

FOREIGN PATENT DOCUMENTS

| 0170270 | 2/1986 | European Pat. Off. | 250/327.2 |
| 0079434 | 6/1980 | Japan | 378/175 |

Primary Examiner—Janice A. Howell
Assistant Examiner—Richard Hanig
Attorney, Agent, or Firm—Finnegan, Henderson, Farabow, Garrett, & Dunner

[57] ABSTRACT

Disclosed is an X-ray image-processing apparatus which is used, for example for diagnosis of a blood vessel. The X-ray image-processing apparatus comprises a plate-type recording medium divided into at least two recording areas, moving apparatus for moving the plate-type recording medium to a first and second position directly below an X-ray incident opening in a frame, so that two X-ray images are recorded in two recording areas respectively, X-ray image input circuitry for reading, as electric signals, the two X-ray images recorded on the recording medium, input image memory for A/D (Analog/Digital) conversion of the output of the X-ray image input circuitry, and for storing the image in the form of digital signals, image separating circuits for separating the two X-ray images from the imput image memory, arithmetic logical operation circuits for subtracting the two X-ray images separated by the image separating circuits and for subtracting the desired image, and a display device for D/A (Digital-/Analog) conversion of the image signals output from the output image memory, and for displaying the resultant image.

18 Claims, 5 Drawing Sheets

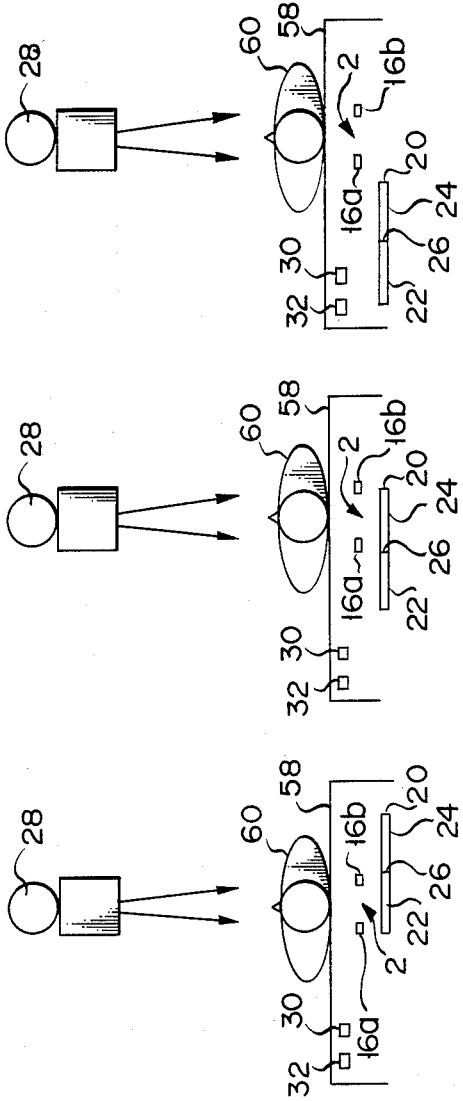

X-RAY IMAGE-PROCESSING APPARATUS

BACKGROUND OF THE INVENTION

1. Field of the Invention

This invention relates to an X-ray image-processing apparatus, such as, particularly, a digital radiographic device.

2. Description of the Prior Art

In the X-ray image-processing apparatus, such as the digital radio-graphic means, an X-ray image of human tissue (hereinafter called a "mask image"), for example, is photographed and then, a contrast medium is immediately injected into a blood vessel of the human tissue. Thus, an X-ray image (hereinafter called a "contrast image") is photographed, immediately after the injection of the contrast medium. The photographed X-ray image is converted into image signals, by means of digital processing. The image signals of the mask image are digitally subtracted from those of the contrast image, thereby causing generation of subtraction image signals. A subtraction image obtained from the subtraction image signals, for example, i.e., only an X-ray image of a blood vessel, is displayed on a display unit and is adapted for a vessel diagnosis.

A system for obtaining a digital subtraction image includes a system for photographing a digital image prior to the subtraction processing. Known systems for obtaining a digital subtraction image include, for example, an image intensifier and a TV camera system, as disclosed in U.S. Pat. No. 3,859,527 (George W. Luckey), an imaging plate system, as disclosed in U.S. Pat. No. 4,485,304 (Teraoka et al). In general, the imaging plate system has the following advantages in comparison with the image intensifier and TV camera system:

The imaging plate system has a very high capability to decompose space in comparison with the system employing the image intensifier and the TV camera. Further, whereas the photographing scope of the system employed in the image intensifier and TV camera is limited to the light-receiving surface of the image intensifier, that of the system employing the imaging plate can be used for the entire surface of the imaging plate. Since it is easy to enlarge the imaging plate, the imaging plate system can thus have a larger photographing scope than the system employing the image intensifier and TV camera.

An X-ray image means for photographing a digital subtraction image, employing the imaging plate system which has such advantages, are disclosed, for example, in U.S. Pat. No. 4,485,304 (M. Teraoka et al), and Japanese Laid Open Patent Publication No. 59-7250. The conventional X-ray image means as disclosed in those publications has an imaging plate-changer, to move the imaging plate to a photographing area, thereby positioning the imaging plate to be opposed to the X-ray tube. The object to be examined, for example, the human body, is laid therebetween. Under such circumstances, a mask image is photographed, for the purposes of examination, and, in lieu of the imaging plate on which the mask image has been photographed, a second imaging plate is moved into position, and a contrast image of the object to be examined, is photographed, following the injection of the contrast medium. These two imaging plates are moved, one after another, to an image input means, by the imaging plate-changer, and their respective surfaces are scanned by laser light. Thus, the image area photographed on the imaging plates is emitted successively, so that any emitted information is detected by a detector and is converted into electric signals. After the image information of the mask image and contrast image has been converted into digital signals, a subtraction image is obtained by means of preferred digital subtraction processing. Further, this digital image is again converted into analog signals, and the resulting image is displayed on a CRT monitor or the like.

Accordingly, after the contrast image has been photographed, photography must be performed in a short time interval prior to the injection of the contrast medium. In the method using a conventional imaging plate-changer, the plate-changer is required to move two imaging plates, one after another, at high speed, instantaneously determine the position of their photography area, and stop them in the correct photography position. Further, the imaging plate-changer must be provided with a high-speed servo system and a high-precision positioning-control system, with the result that its construction becomes complicated and its manufacturing cost consequently becomes expensive.

SUMMARY OF THE INVENTION

It is an object of this invention to provide an X-ray image-processing apparatus, for photographing a contrast image and a mask image, carrying out processing of those images and obtaining a digital subtraction image, said X-ray image-processing apparatus enabling easy design of a high-speed servo system and a positioning-control system, simplified construction, and an inexpensive manufacturing cost.

According to the invention, there is provided an X-ray image-processing apparatus comprising:

means for generating X-rays toward an object to be examined;

a plate-type recording medium having at least a first recording area and a second recording area upon which first and second X-ray image are to be recorded, respectively;

an incident opening through which X-rays having transmitted said object pass;

means for moving said plate-type recording medium to a first position and a second position, in which, when said recording medium is moved to said first position, said first area of said recording medium is opposed to said opening, and the first X-ray image of said object is photographed onto said first area; while said recording medium is moved to said second position, said second area of said recording medium is opposed to said opening, and the second X-ray image of said object is photographed onto said second area;

means for converting two X-ray images recorded on said recording medium into a first image signal and a second image signal;

input image memory means for converting said first and second image signals into digital signals, and storing these signals;

arithmetic logical operation means for operating subtraction image signals, by subtraction processing between said first and second image signals;

output image memory means for storing said subtraction image signals; and display means for D/A (Digital/Analog) conversion of said subtraction image signals stored in said output image memory means, and for displaying the resultant image.

BRIEF DESCRIPTION OF THE DRAWINGS

FIGS. 3A to 3C are respectively side views showing schematically a motion for photographing an image on an imaging plate of the X-ray image-processing apparatus;

DETAILED DESCRIPTION OF PREFERRED EMBODIMENTS

An embodiment of this invention will now be described with reference to the accompanying drawings.

Figure 1:
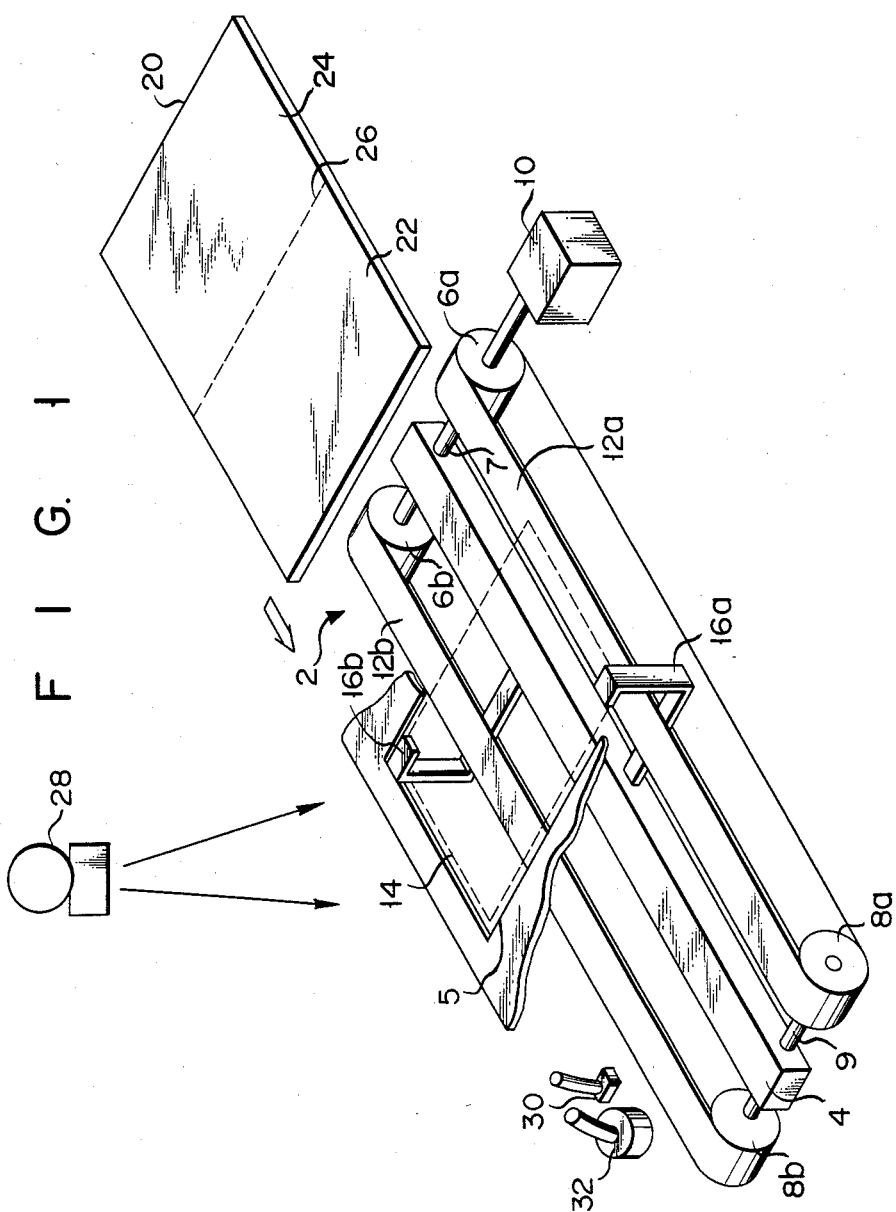
FIG. 1 is a schematic perspective view of a main part of the X-ray image-processing apparatus according to an embodiment of this invention.

FIG. 1 shows a moving means for the X-ray image-processing apparatus according to an embodiment of this invention. Moving means 2 for moving an imaging plate 20 (hereinafter called "IP"), as shown in FIG. 1, comprises a base 4 and is situated below a bed 5, on which an object to be examined is laid. Rear rollers 6a, 6b, and front rollers 8a, 8b, are supported by rotary shafts 7 and 9, respectively, and are rotatably disposed at opposite ends (i.e., front end and rear end, respectively) of base 4. Belts 12a and 12b are respectively mounted on rear rollers 6a, 6b and on front rollers 8a, 8b. A motor 10, for driving belts 12a, 12b, is connected to rotary shaft 7 of the rear rollers 6a, 6b. The frame of bed 5 is made of an X-ray nontransmitting member, and is provided with an opening, to define a photography area 14, shown as a dashed line in FIG. 1. A pair of marker members, 16a and 16b, which are made of an X-ray non-transmitting material, are situated at corners of a diagonal line of photographing area 14, in order to determine the position of IP 20 in the photography area 14.

IP 20 is, for example, of a square form, and has two or more times the photography area of photography area 14. It is divided into two photography areas 22, 24, as shown by dashed line 26 in FIG. 1. Further, IP 20 is moved in the direction marked by an arrow, by moving means 2. An X-ray tube 28, which is opposed to photographing area 14 of moving means 2, is located above the object (not illustrated) to be examined. A laser light source 30 is situated above the front part of moving means 2 and emits laser light onto areas 22, 24 after IP 20 has been photographed, thereby producing a photographic image emission. A light-detector 32 whose light-receiving element is opposed to IP 20 is situated adjacent to laser light source 30. Accordingly, IP 20 is irradiated by laser light from source 30, and its emission produced from IP 20 is detected by light detector 32. Thus, the image element information of the image photographed in the respective areas 22, 23, is input by detector 32.

Figure 2:
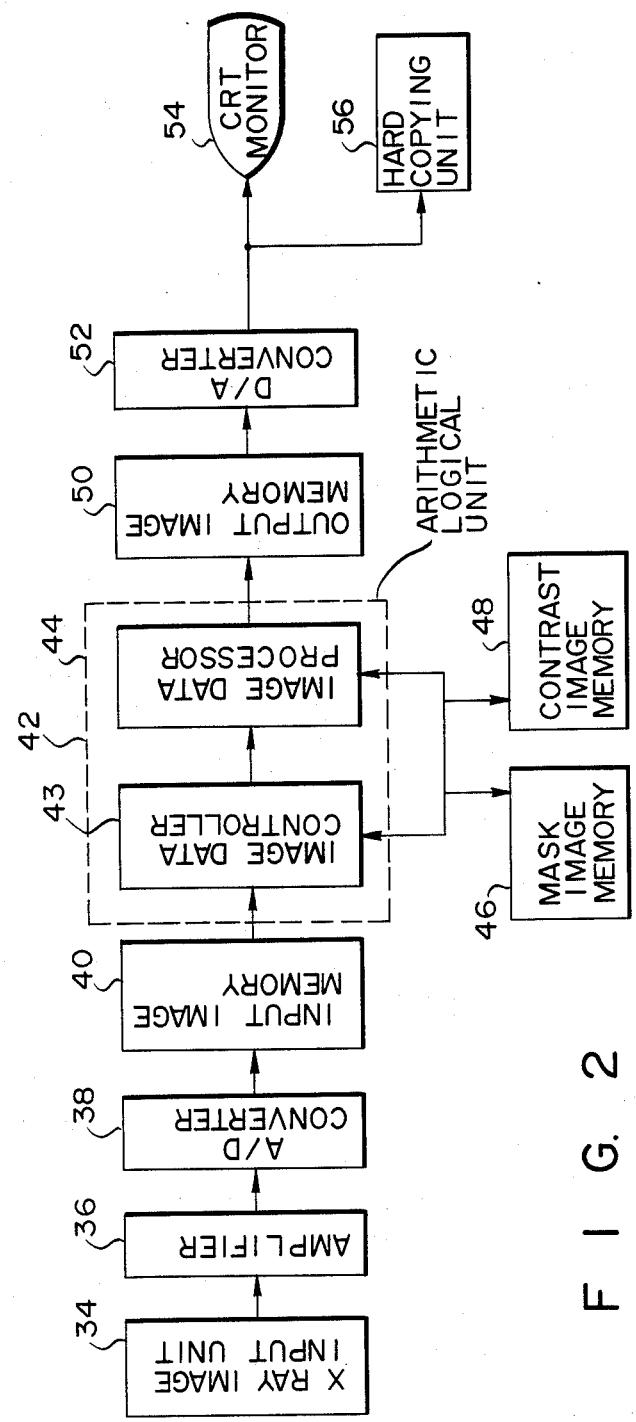
FIG. 2 is a block diagram of an electric circuit of the aforesaid X-ray image-processing apparatus.

FIG. 2 shows a block diagram of an electric circuit of the X-ray image-processing apparatus. An X-ray image-input unit 34 corresponds to detector 32 in FIG. 1. The X-ray image is converted into image signals, consisting of the image element information, by input unit 34 and image signals are supplied to an amplifier 36. The image signals amplified by the amplifier 36 are converted into digital signals by A/D converter 38, and are stored temporarily in an input image memory 40. The image signals stored in memory 40 are divided, at image data controller 43, into signals corresponding to the contrast image and the mask image respectively. The image signals corresponding to the mask image are stored in a mask image memory 46, while those corresponding to the contrast image are stored in a contrast image memory 48. The mask image signals and contrast image signals are sent from mask image memory 46 and contrast image memory 48 respectively, to an arithmetic logical unit 42 having an image data-processor 44, at the time of image processing. Then, the mask image signals are subtracted from the contrast image signals, whereby the subtraction image signals are output to an output image memory 50 and are stored therein.

When displaying the subtraction image, the subtraction image signals stored in output image memory 50 are supplied to D/A converter 52 and are converted into analog signals. The analog image signals are displayed on CRT monitor 54 or are printed by a hard copying unit 56.

The operation of the X-ray image-processing apparatus of this embodiment will now be described. As is shown in FIG. 3A, an object 60 to be examined is placed on an X-ray incident opening 5 formed on a frame of a bed 58. Then, IP 20 is moved by moving means 2 and first photography area 22 is positioned directly below the X-ray incident opening 5. Then, X-ray tube 28 is energized, and X-ray having transmitted the object 60 to be examined passes through opening 5 of bed 58. Then, first area 22 of IP is exposed. A mask image of the object (60) prior to the injection of the contrast medium thereinto, is photographed, and the marker images 17a, 17b are also photographed.

After this step, as is shown in FIG. 3B, IP 20 is moved a further predetermined distance, and second photography area 24 is positioned directly below X-ray incident opening 5. As soon as the contrast medium is injected into the object 60, in a very short time, for example, within about 0.3 seconds from the first photographing, second photography area 24 of IP 20 is exposed by application of X-ray tube 28. Accordingly, the contrast image of the object (60) is photographed, after the contrast medium has been injected therein. At the same time, marker images 18a, 18b are also photographed.

As is shown in FIG. 3C, IP 20 is moved downward of laser light source 30, and the surfaces of photography areas 22, 24 of IP 20 are illuminated by the laser light from laser light source 30. Thus, the image photographed on the IP surface is emitted and regenerated, whereby this emission is detected by detector 32, and the image signals are input therein.

Figure 4A:
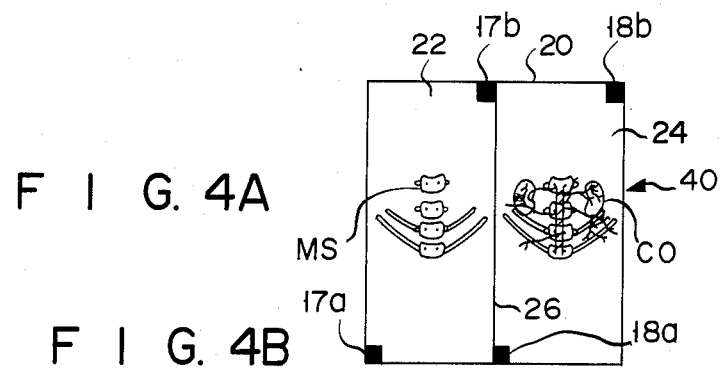
FIGS. 4A to 4D are respectively plan views of the processing of the image photographed on the imaging plate.
Figure 4B:
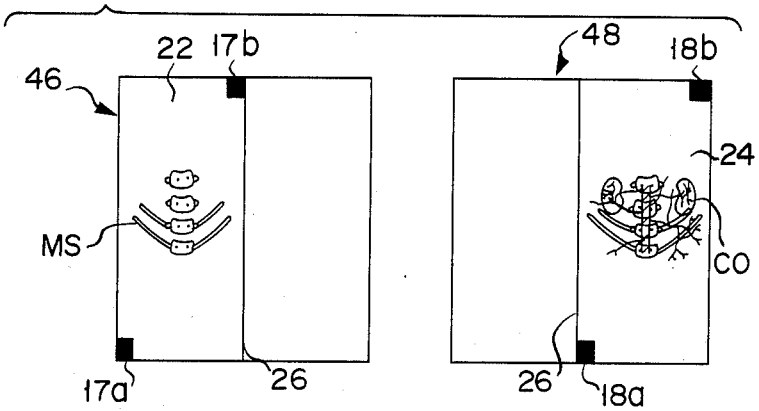
Figure 4C:
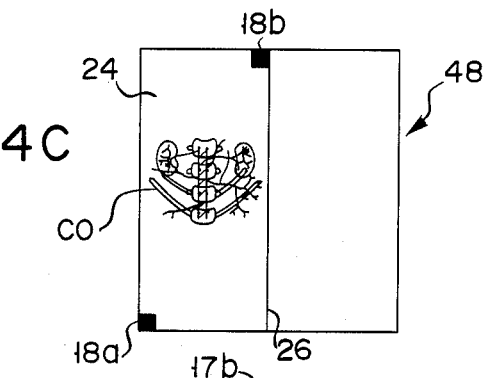
Figure 4D:
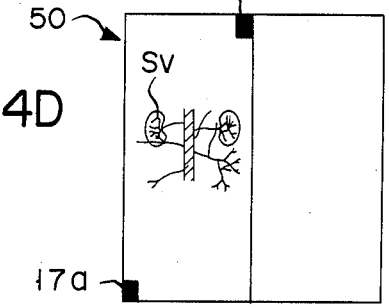
Figure 5A:
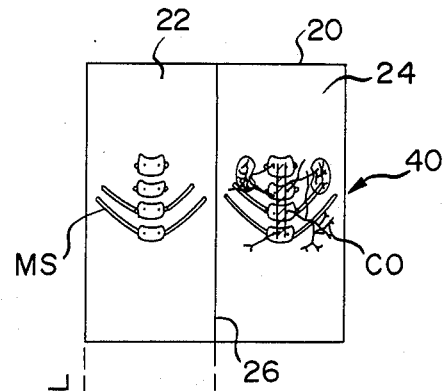
FIG. 5A is a plan view of the imaging plate on which the subtraction image and the contrast image have respectively been photographed.
Figure 5B:
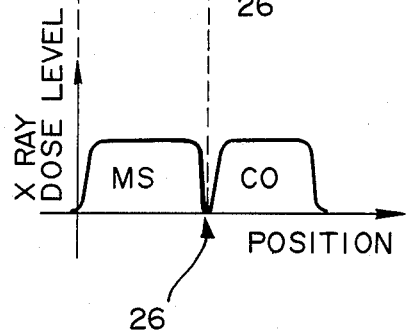
FIG. 5B is a distribution graph of X-ray radiation on the imaging plate of FIG. 5A.

FIG. 4A shows the mask image (MS) and the contrast image (CO) which have been detected by detector 32, and stored in input image memory 40. The two images are partitioned by a partitioning line 26, and the marker images 17a, 17b, 18a, 18b are photographed at a corner, opposing one another, on a diagonal line.

Next to this, the mask image (MS) and the contrast image (CO) stored in input image memory 40 are separated from each other by image data controller 43. Referring to this separating process, as shown in FIGS.

5A and 5B, because a low level area occurs between the two images, it is possible to specify the area where each image is recorded. Additionally, it is possible to distinguish between a contrast image or a mask image, based on the reading sequence of that area.

The mask image (MS) and contrast image (CO) having the marker images, are stored in mask image memory 46 and contrast image memory 48 respectively, each at the same address, on the basis of the marker images. Since the address, based on the image elements of the marker image, is given by the arithmetic logical unit, the image element information is stored in the memory, on the basis of its address. The image element stored at a particular address in contrast image memory 48 and the image element stored at the same address in mask image memory 46, together signify the image address indicating the same area of the object to be examined, such as, for example, the image of the same collarbone area. After the image has been stored in contrast image memory 48 and in mask image memory 46, image data-processor 44 reads the mask image (MS) and the contrast image (CO), and subtraction processing is executed, on the basis of the address. Consequently, the thus-obtained subtraction image (SU) is described in output image memory 50 and is displayed on the CRT monitor, by way of D/A converter 52.

As was discussed in detail previously, the X-ray image-processing apparatus according to this embodiment enables easy positioning of the photography area, since two X-ray images can be photographed on one piece of IP 20. Accordingly, the construction of a high-speed servo system and a positioning-control system is simplified, and its design becomes easy when compared with a case wherein a plurality of IP's are moved. Further, since two images are recorded upon one IP, it is possible to remove any image error when regenerating the images recorded on respective IP's having different properties. Thus, it is possible to improve the accuracy of the subtraction image.

This invention is not limited to the aforesaid embodiment; that is, this invention is applicable not only for the IP as a plate-type recording medium, but also for X-ray film. In the case of X-ray film, X-ray image input unit 34 may be composed of photographing elements for detecting an optical image. Further, the means for feeding the X-ray film may be a typical spot-shot device, so that only the markers for locating a desired position need be disposed.

Also, in the device where a photography area and an X-ray image-processing means are separated from each other, the same performance and effect can be obtained, because the markers for locating a desired position are suitably disposed.

Preferably, marker members 16a, 16b are situated between the object to be examined and the plate-type recording medium. Further, they may be located on bed 58, but not on moving means 2. Further, the size and shape of the marker members may be modified in a suitable manner, if required. Still further, if the mounting position of the marker members and the distance of movement of IP 20 are modified, the photography area of IP 20 may be divided easily into two or more smaller areas. It is to be understood that various modifications of this invention may be made within the spirit and scope of the invention.

What is claimed is:

1. An X-ray image-processing apparatus comprising:
    a frame having an incident opening;
    means for generating X-rays directed through said opening and toward an object to be examined;
    a plate-type recording medium having at least a first recording area and a second recording area upon which first and second X-ray images are to be recorded, respectively;
    means for moving said plate-type recording medium to a first position, wherein said first area of said recording medium is aligned with said opening, and to a second position wherein said second area of said recording medium is aligned with said opening;
    means for obtaining said first X-ray image of said object when said recording medium is in said first position and for obtaining said second X-ray image of said object when said recording medium is in said second position;
    means for inserting a marker image in said first x-ray image and a marker image in said second X-ray image, said marker images occurring at substantially the same location in both said first and second X-ray images;
    X-ray image conversion means for converting said first and second X-ray images recorded on said recording medium into first image signals and second image signals, respectively;
    input image memory means for converting said first and second image signals into digital first and second image signals, and for storing these signals;
    arithmetic logical operation means for obtaining digital subtraction image signals, by performing subtraction processing between said digital first and second image signals;
    means for permitting said subtraction processing of said arithmetic means to occur for corresponding locations of said object in said digital first and second image signals in response to identification of said marker image in each of said digital first and second image signals;
    output image memory means for storing said digital subtraction image signals; and
    display means for displaying a resultant image based upon said digital subtraction image signals.

2. An X-ray image-processing apparatus according to claim 1, wherein said inserting means comprises first and second marker members each situated in one of diametrically opposed corner portions, of said opening.

3. An X-ray image-processing apparatus according to claim 1, wherein said inserting means is situated between said object to be examined and said plate-type recording medium.

4. An X-ray image-processing apparatus according to claim 1, further comprising means for separating the digital first and second image signals stored in said input image memory means.

5. An X-ray image-processing apparatus according to claim 4, further comprising first and second image memories for storing, respectively, said separated digital first and second image signals.

6. An X-ray image-processing apparatus according to claim 4, wherein dose levels are associated with said digital first and second image signals and wherein said separating means separates said digital first and second image signals from each other in accordance with said associated dose levels of said digital first and second image signals.

7. The X-ray image-processing apparatus according to claim 1, wherein said input image memory means comprises:
- amplifying means for amplifying said first and second image signals from said X-ray image conversion means;
- means for converting said amplified first and second image signals into said digital first and second image signals; and
- an input image memory for temporarily storing said digital first and second image signals.

8. An X-ray image-processing apparatus according to claim 1, wherein said display means comprises:
- converter means for converting said digital subtraction image signals into analog subtraction image signals; and
- a CRT monitor for displaying said resultant image based upon said analog subtraction image signals.

9. An X-ray image-processing apparatus according to claim 7, further comprising:
- means for converting said digital subtraction image signals into analog subtraction image signals; and
- means for providing a resultant hard-copy image based upon said analog subtraction image signals.

10. An X-ray image-processing apparatus according to claim 1, wherein said plate-type recording medium comprises an imaging plate, and wherein said X-ray image conversion means comprises a laser light source for emitting a laser beam directed toward said imaging plate, said imaging plate emitting said first and second X-ray images in response to receipt of said laser beam, and detector means for detecting said first and second X-ray images emitted from said imaging plate for conversion into said first and second image signals, respectively.

11. An X-ray image-processing apparatus comprising:
- a plate-type recording medium having at least a first recording area and a second recording area on which mask and contrast X-ray images have been recorded said recorded mask and contrast X-ray images each including a marker image which corresponds to the same location in each image;
- X-ray image conversion means for converting said mask and contrast X-ray images recorded on said recording medium into mask and contrast image signals, respectively;
- input image memory means for converting said mask and contrast X-ray image signals into digital mask and contrast image signals, and for storing these signals;
- means for permitting said subtraction processing of said arithmetic means to occur for corresponding locations in said digital mask and contrast images in response to identification of said marker image in each of said digital mask and contrast image signals;
- output image memory means for storing said digital subtraction image signals; and
- display means for displaying a resultant image based upon said digital subtraction image signals.

12. An X-ray image-processing apparatus according to claim 11, further comprising means for separating said digital mask and contrast image signals stored in said input image memory means.

13. An X-ray image-processing apparatus according to claim 11, further comprising a mask image memory and a contrast image memory for storing, respectively, said separated digital mask and contrast image signals.

14. An X-ray image-processing apparatus according to claim 12, wherein dose levels are associated with said digital mask and contrast image signals and wherein said separating means separates said digital mask and contrast image signals from each other in accordance with said associated dose levels of said digital mask and contrast image signals.

15. An X-ray image-processing apparatus according to claim 11, wherein said input image memory means comprises:
- amplifying means for amplifying said mask and contrast image signals from said X-ray image conversion means;
- A/D converter means for converting said amplified mask and contrast image signals into said digital mask and contrast signals; and
- an input image memory for temporarily storing said digital mask and contrast image signals.

16. An X-ray image-processing apparatus according to claim 11, wherein said display means comprises:
- D/A converter means for converting said digital subtraction signals into analog signals; and
- A CRT monitor for displaying said resultant image based upon said analog subtraction image signals.

17. An X-ray image-processing apparatus according to claim 11, further comprising:
- D/A converter means for converting said digital subtraction image signals into analog subtraction image signals; and
- means for providing a hard-copy image based upon said analog subtraction image signals.

18. An X-ray image-processing apparatus according to claim 11, wherein said plate-type recording medium comprises an imaging plate, and wherein said X-ray image conversion means comprises a laser light source for emitting a laser beam directed toward said imaging plates, said imaging plate emitting said mask and contrast X-ray images in response to receipt of said laser beam and detector means for detecting said mask and contrast X-ray images from said imaging plate for conversion into said first and second image signals, respectively.

* * * * *